United States Patent
Hammes et al.

(10) Patent No.: US 9,798,003 B2
(45) Date of Patent: Oct. 24, 2017

(54) DISTANCE MEASURING SENSOR AND METHOD FOR THE DETECTION AND DISTANCE DETERMINATION OF OBJECTS

(71) Applicant: SICK AG, Waldkirch (DE)

(72) Inventors: Markus Hammes, Waldkirch (DE); Martin Muncher, Waldkirch (DE)

(73) Assignee: SICK AG, Waldkirch (DE)

( * ) Notice: Subject to any disclaimer, the term of this patent is extended or adjusted under 35 U.S.C. 154(b) by 390 days.

(21) Appl. No.: 14/593,305

(22) Filed: Jan. 9, 2015

(65) Prior Publication Data
US 2015/0204978 A1 Jul. 23, 2015

(30) Foreign Application Priority Data
Jan. 22, 2014 (DE) .................. 10 2014 100 696

(51) Int. Cl.
*G01C 3/08* (2006.01)
*G01S 17/08* (2006.01)
(Continued)

(52) U.S. Cl.
CPC ............ *G01S 17/08* (2013.01); *G01S 7/2923* (2013.01); *G01S 7/487* (2013.01); *G01S 7/4865* (2013.01); *G01S 13/10* (2013.01); *G01S 17/10* (2013.01)

(58) Field of Classification Search
CPC ........ G01S 17/10; G01S 17/08; G01S 7/2923; G01S 7/487; G01S 7/4865; G01S 13/10
(Continued)

(56) References Cited

U.S. PATENT DOCUMENTS

| 6,057,910 A * | 5/2000 | Dunne | G01C 3/08 342/203 |
| 6,975,251 B2 * | 12/2005 | Pavicic | H03M 1/127 341/122 |
| 2010/0128248 A1 * | 5/2010 | Heizmann | G01S 7/484 356/5.01 |

FOREIGN PATENT DOCUMENTS

| EP | 1972961 A2 | 3/2008 |
| EP | 2 189 814 A1 | 5/2010 |

(Continued)

OTHER PUBLICATIONS

European Search Report dated Apr. 30, 2015 issued in corresponding European Application No. 14195141.8-1812.
(Continued)

*Primary Examiner* — Mark Hellner
(74) *Attorney, Agent, or Firm* — Nath, Goldberg & Meyer; Jerald L. Meyer

(57) ABSTRACT

A distance measuring sensor (10) for a detection and distance determination of objects (18) in a monitoring area, the sensor (10) having a transmitter (12) for transmitting transmission pulses, a receiver (20) for generating a reception signal from transmission pulses remitted from the monitoring area, an A/D converter (38) for digitizing the reception signal, and a control and evaluation unit (28, 30), which is configured to transmit a plurality of transmission pulses via the transmitter (12), to accumulate the respective reception signals generated by the receiver (20) in a histogram (110), and to determine, from the histogram (110), a reception point in time and thus a measurement value for the signal time of flight from the sensor (10) to the object (18), wherein the sensor (10) comprises a noise generator (40) configured to add a noise signal to the reception signal prior to its digitization in the A/D converter (38).

15 Claims, 5 Drawing Sheets

Figure 1:
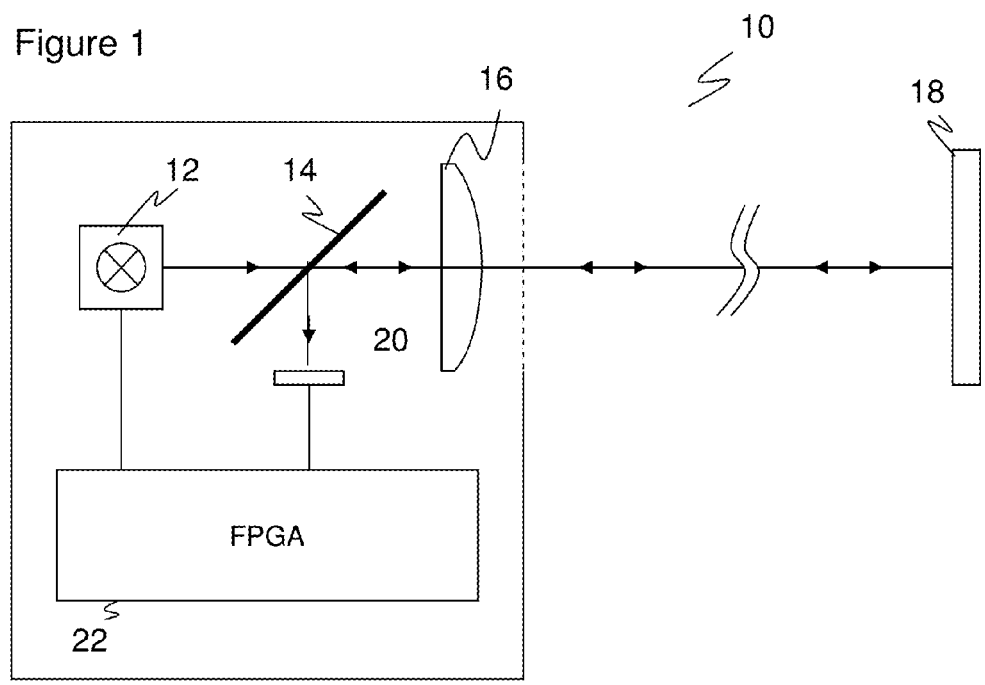

(51) Int. Cl.
      *G01S 17/10*    (2006.01)
      *G01S 7/292*    (2006.01)
      *G01S 7/487*    (2006.01)
      *G01S 13/10*    (2006.01)
      *G01S 7/486*    (2006.01)

(58) Field of Classification Search
    USPC .......................................................... 356/5.01
    See application file for complete search history.

(56) References Cited

FOREIGN PATENT DOCUMENTS

| | | |
|---|---|---|
| EP | 2189804 A1 | 5/2010 |
| EP | 2189805 A1 | 5/2010 |
| EP | 2469296 A1 | 10/2011 |
| WO | 99/60419 A1 | 11/1999 |
| WO | 2005/045464 A1 | 5/2005 |
| WO | 2005045464 A1 | 5/2005 |

OTHER PUBLICATIONS

German Office Action dated Sep. 4, 2014 corresponding to application No. 102014100696.8.

* cited by examiner

DISTANCE MEASURING SENSOR AND METHOD FOR THE DETECTION AND DISTANCE DETERMINATION OF OBJECTS

The invention relates to a distance measuring sensor and a method for the detection and distance determination of objects.

A number of sensors make use of a signal time of flight principle, wherein the time interval between transmission and reception of a signal is converted into a distance by means of the signal speed. Frequency regions of the electromagnetic spectrum as different as micro waves and light can be utilized. One application for micro waves is level measurement, where the signal time of flight for a reflection from a boundary surface of the medium is measured, whose fill level is to be determined. The transmitted micro waves are guided in a probe (TDR, time domain reflectometry), or alternatively are freely radiated and reflected from the boundary surface like in a radar.

In optoelectronic sensors according to the principle of a light time of flight method, light signals are transmitted, and the time is measured until the light signals remitted or reflected by objects are received. Optoelectronic distance measurement can be used for example in vehicle safety, logistic or factory automation, and safety technology. Generally, the desired output variable is the measured distance. Alternatively, a distance measurement device according to the light time of flight method can also work as a switch by monitoring a distance variation of a reflector or a reflecting or remitting object expected in a certain distance. One particular application is a reflective light barrier monitoring the distance of its reflector. The light time of flight method also is the principle distance measuring laser scanners operate on, which periodically scan a monitoring plane or even a three-dimensional region of space. In safety technology, safe laser scanners are used which monitor configurable protection zones for inadmissible intrusions. Safe sensors need to be particularly reliable and therefore meet high safety requirements, for example the standard EN13849 for machine safety and the device standard EN61496 for contactless protection devices. In order to comply with these safety standards, a number of measures need to be taken, such as a safe electronic evaluation by redundant, diverse electronics, function monitoring, or more particularly monitoring degradation of optical components such as a front screen, and/or provision of individual test targets of defined reflectance which have to be detected in respective scan angles.

The accuracy of the distance measurement crucially depends on the precision of determining the reception point in time. Conventional pulse methods transmit a single pulse and determine the position of the received echo pulse. The echo pulse is distinguished from interference signals by means of a comparator threshold. This is reliable only if the interference signals are distinguishably smaller than the smallest echo pulse to be resolved. Difficulties arise in particular when the received signal is superimposed by strong noise for example from external light, when a weak desired signal from large distances is to be resolved, or when adverse environmental conditions prevail which systematically cause relatively strong echo pulses not to be detected, for example from fog, high dust pollution of the air or dirt on a front screen of the sensor. The conventional countermeasure is an attempt to generate a large signal distance between weakest desired signal and relevant noise levels by structural measures like optical stray light suppression, low-noise electronic signal processing and the like. The resulting signal distance decides about the robustness of the system against the various interference effects.

For example from EP 1972961 A1 or EP 2469296 A1, a time of flight method is known which performs a plurality of individual measurements with one respective transmission pulse and adds the corresponding reception signals in a histogram, instead of a single pulse evaluation. By that statistical evaluation, the desired signal adds up, while the random noise effects are averaged out, so that the signal-to-noise-ratio is significantly improved. A special feature of this method is that several measures are taken in order to perform this complex evaluation on very low-cost hardware. This includes to merely use a comparator instead of an expensive high-speed A/D converter which digitizes the individual signals with only a 1-bit resolution, i.e. binarizes. Moreover, in EP 2 189 804 A1 and EP 1 189 805 A1, the effective sampling rate of such a statistical method is significantly increased by several measures in order to detect the reception point in time and thus the light time of flight with greater temporal precision. The disadvantage is that the 1-bit sampling destroys information about the original signal level. Therefore, depending on the situation, it is hardly possible to distinguish weak echoes for example from interfering particles or a front screen from echoes from an object to be detected. The method therefore may be very sensitive to systematic noise.

It is therefore an object of the invention to improve the reliability of the measured value acquisition of a distance-measuring sensor.

This object is satisfied by a distance measuring sensor for the detection and distance determination of objects in a monitoring area, the sensor having a transmitter for transmitting transmission pulses, a receiver for generating a reception signal from transmission pulses remitted from the monitoring area, an A/D converter for digitizing the reception signal, and a control and evaluation unit, which is configured to transmit a plurality of transmission pulses via the transmitter, to accumulate the respective reception signals generated by the receiver in a histogram, and to determine, from the histogram, a reception point in time and thus a measurement value for the signal time of flight from the sensor to the object, wherein the sensor comprises a noise generator configured to add a noise signal to the reception signal prior to its digitization in the A/D converter.

The object is also satisfied by a method for the detection and distance determination of objects in a monitoring area, wherein a plurality of transmission pulses is transmitted and reception signals are generated from the transmission pulses remitted from the monitoring area, the reception signals are digitized and accumulated in a histogram in order to determine, from the histogram, a reception point in time and thus a measuring value for the signal time of flight to the object, wherein a noise signal is added to the reception signal prior to its digitization.

Hence, the starting point is following the statistical approach as explained in the introduction of transmitting a plurality of individual pulses and accumulating a histogram of the subsequently recorded digitized reception signals. Then, the invention is based on the idea to introduce an artificial noise prior to the digitizing and in particular to add a random noise to the reception signal.

It turns out at a low bit resolution of the A/D converter and in particular at a 1-bit resolution for the digitization of the receptions signal that in the histogram small interference echoes can no longer be distinguished from the true echoes of the objects to be detected. This phenomenon is particularly strong, paradoxically, with a low intrinsic noise. Therefore, the usual measures for a conventionally improved measurement even lead to a worse situation. In the extreme case of ideal signal without noise and a 1-bit resolution of the A/D converter, even a minimal interference echo is in principle indistinguishable from a very large true echo, i.e. for example a dust particle from a bright, large target. That is because even the dust particle already drives the histogram into saturation, i.e. all bins in a region of the echo signal caused by the dust particle are already filled to the maximum. This is solved according to the invention by adding artificial noise. The sensitivity of the sensor can be adjusted by the ratio of artificial noise level and a desired level to be resolved.

The invention has the advantage that an operating point can be set by the artificial noise where the sensor robustly distinguishes between interfering echoes and true echoes. This reduces measurement errors. In a safe sensor, erroneous shut-downs due to interfering signals are prevented, thus significantly improving availability.

The A/D converter preferably is a binarizer. Hence, digitization only has a 1-bit resolution. Here and throughout the description, preferably refers to a preferred, but completely optional feature. A binarization can be easily and cost-effectively implemented by a comparator and a limiting amplifier, respectively, so that no high-quality A/D converter with a high sampling rate and at the same time high bit resolution is required. The problem as discussed above that interfering echoes and true echoes cannot sufficiently be distinguished at low bit resolution is particularly evident in the extreme case of binarization. The information is just enough to distinguish between "event" and "no event", but does not at all allow for a quantitative assessment of an "event". Thus, the distinctness by a suitable artificial noise is particularly advantageous.

An analog preprocessing circuit including a filter for a conversion of a unipolar reception signal into a bipolar signal is preferably arranged between receiver and A/D converter. The echoes of the transmission pulses from objects or sources of interference in the monitoring area initially are also at least roughly pulse-shaped, i.e. they form a peak and are thus unipolar. This is particularly true for light signals which cannot be negative and thus only generate unipolar reception signals. The filter converts the unipolar reception signal into a bipolar signal for example as an oscillation having at least a maximum, a minimum, and a zero crossing in between. A band pass filter or a differentiator is particularly suitable for the filter. The preprocessing circuit may additionally comprise an amplifier, in particular a transimpedance amplifier, upstream the filter and a limiter amplifier downstream the filter for amplifying the positive and negative part of the bipolar signal, respectively, up to a saturation value. The limiter amplifier drives the bipolar signal into saturation so that it is detected in a subsequent threshold evaluation in a binarizer under all circumstances.

The control and evaluation unit is preferably implemented on a digital module, in particular on a PLD (Programmable Logic Device), an ASIC (Application-Specific Integrated Circuit), or an FPGA (Field Programmable Gate Array). Such a digital module is relatively inexpensive and yet not only able to meet the requirements of a high precision measurement, thanks to the histogram or pulse averaging method according to the invention, but also to implement many of the required functions rather than providing separate components, for example the A/D converter in the form of comparators at the inputs, or the noise generator. Here and in the following, a digital module is any configurable evaluation which is adapted for the application by pre-configuration of the digital circuitry of the digital module, instead of running a program on a universal evaluation unit like a true microprocessor. The presently preferred embodiment of such a programmable logic is an FPGA. Therefore, in the following, an FPGA is several times used in lieu of the entire family of digital modules as explained, but the invention is not limited thereto.

The noise generator preferably is implemented as a digital unit, in particular on the digital module of the control and evaluation unit. This enables an almost free definition of noise properties, like level, spectrum, or type of noise. As already said in the previous paragraph, the digital noise generator can be implemented at practically no costs on the digital module of the control and evaluation unit. However, a DAC is still necessary to add the noise to the analog reception signal. As an alternative to a digital noise generator, an analog noise generator is also conceivable, or the noise is introduced even prior to the receiver, for example in the case of an optoelectronic sensor in the form of light.

The noise generator preferably generates a noise level adaptable by the control and evaluation unit in order to set a reception sensitivity of the sensor. Due to the particular evaluation, especially in case of the preferred A/D conversion with 1-bit resolution, a weak reception signal suffices to saturate the histogram. With the artificial noise signal, variability is introduced, so that weak and strong signals lead to different histograms. The ratio of desired signal to noise signal determines the sensitivity, and thus the sensitivity can be set by the noise level. This will be explained in more detail below in the description of the embodiments of the invention with reference to the figures.

The control and evaluation unit is preferably configured to set a suitable noise level of the noise generator in advance. This is kind of a calibration setting an appropriate noise level where the sensor can reliably distinguish interference signals from desired signals. For example, the noise level is set in relation to a known interference signal, like a front screen reflection, so that it is no longer detected as a desired signal.

The control and evaluation unit is preferably configured to take account of a natural noise signal when setting a noise level of the noise generator. To be exact, it is not the artificial noise level which is relevant, but the total noise including natural or intrinsic noise. This is what leads to the initial paradox that a low-noise system is particularly vulnerable to weak echo signals. Therefore, in this preferred embodiment, the artificial noise level is set so that only the sum of natural and artificial noise signal leads to the required noise level. This can be done statically, for example based on an expected intrinsic noise, but also dynamically by measuring the intrinsic noise and adapting the artificial noise level. This approach makes the sensor very robust and is used, for example, as a very simple and effective external light compensation.

The control and evaluation unit is preferably configured to vary a noise level of the noise generator during accumulation of a histogram. This dynamically varies the sensitivity of the sensor. The conversion can be made between individual measurements. The histogram thus includes reception signals which are measured with differing sensitivity, with an overall increase of the dynamic range. As an alternative or additionally, it is also possible to switch within a single measurement. This leads to a differing sensitivity for different distances, for example to counteract against a distance-dependent decrease in intensity.

The control and evaluation unit is preferably configured for a multi-channel recording and evaluation of histograms in order to evaluate the reception signal with different sensitivities due to different noise levels of the noise generator in the plurality of channels. This increases dynamic range, because the channels complement each other. When implemented on an FPGA, the additional channels require only some spare computing power and free inputs with comparators as binarizers. The channels are commonly evaluated in an intelligent way, for example by selecting one channel providing a sufficiently filled, but not yet saturated histogram, or by averaging the results of the individual channels, possibly weighted with a quality measure. A multi-channel evaluation can be emulated with a single channel by sequentially recording and evaluating histograms with differing artificial noise level.

The sensor preferably comprises a test signal generator for injecting a test signal into the analog part of the receiving path in order to check the function of the receive path. The test signal in particular is a test pulse with an amplitude corresponding to a desired signal to be detected. The test thus includes a check whether the desired sensitivity is actually set. It is expected to reliably detect the test pulse in the histogram. Otherwise, an error is assumed, for example with the selected noise level, the noise generator, or another component in the reception path and its evaluation, respectively.

The sensor preferably is configured as an optoelectronic sensor, in particular a laser scanner, wherein the transmitter is a light transmitter and the receiver is a light receiver. Such light-based sensors are often used for distance measurement. They may be one dimensional, i.e. aimed at a measuring object. Another example is a laser scanner, where the direction for transmitting transmission pulses is periodically varied for example by a rotating mirror, so that a monitoring plane or even a region of space is scanned. An example for an alternative sensor not based on optical signals is a TDR level sensor.

The method in accordance with the invention can be further developed in a similar manner with additional features and shows similar advantages. Such advantageous features are described in an exemplary, but not exclusive manner in the subordinate claims following the independent claims.

Figure 2:
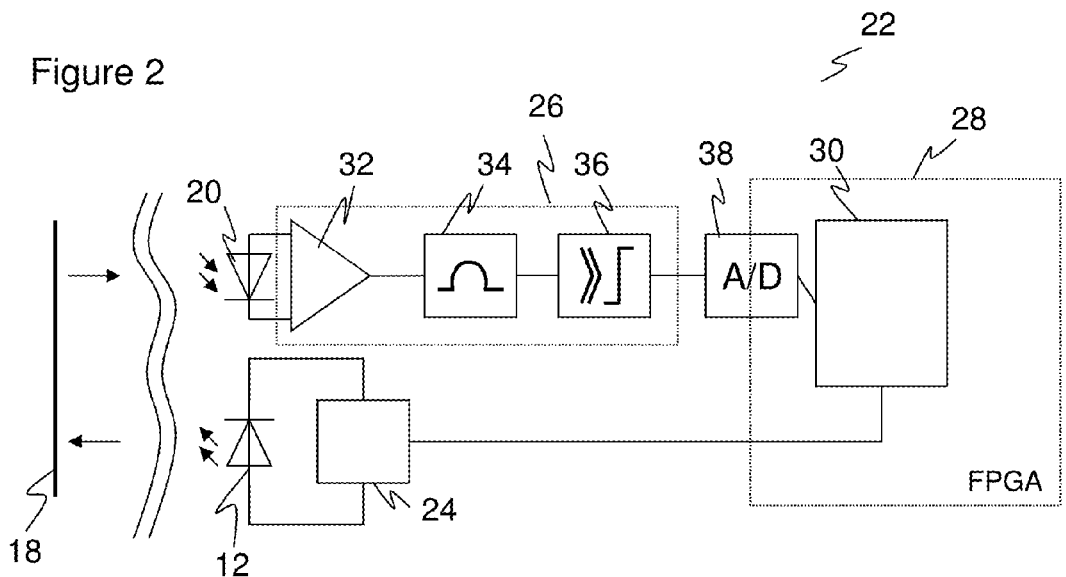
Figure 3:
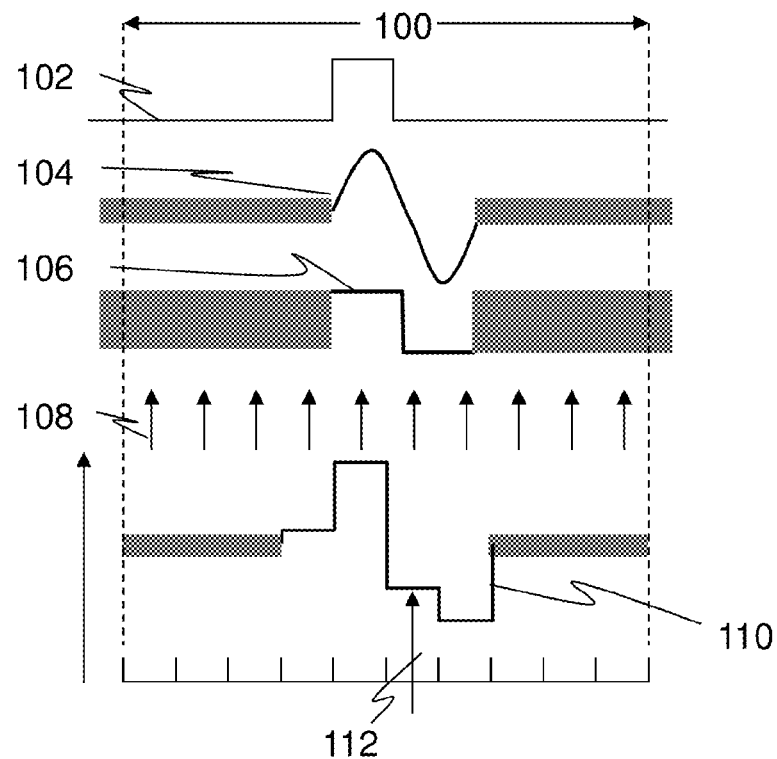
Figure 4A:
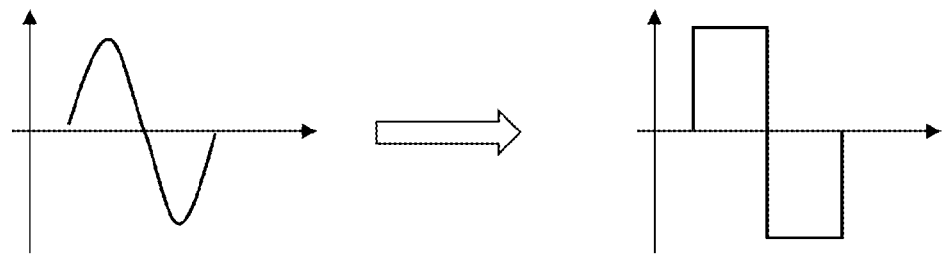
Figure 4B:
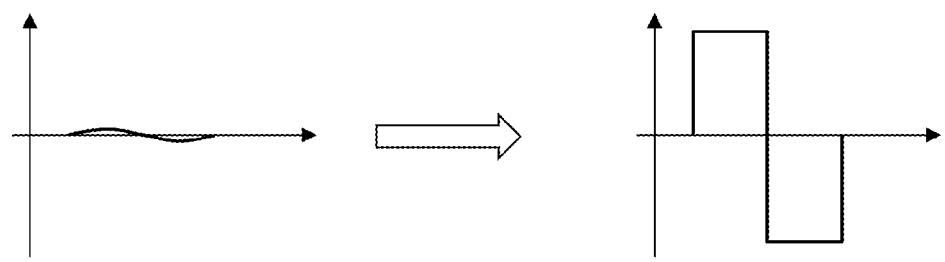
Figure 5A:
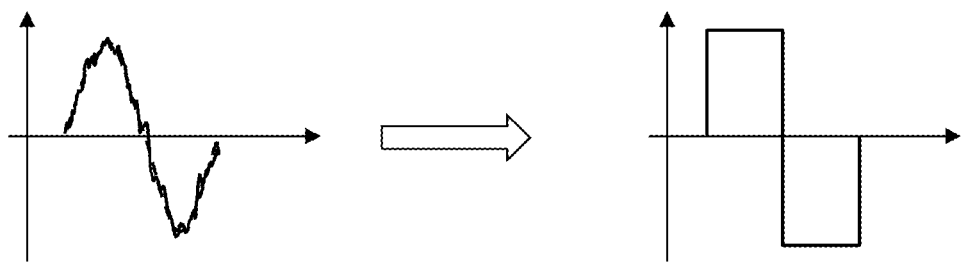
Figure 5B:
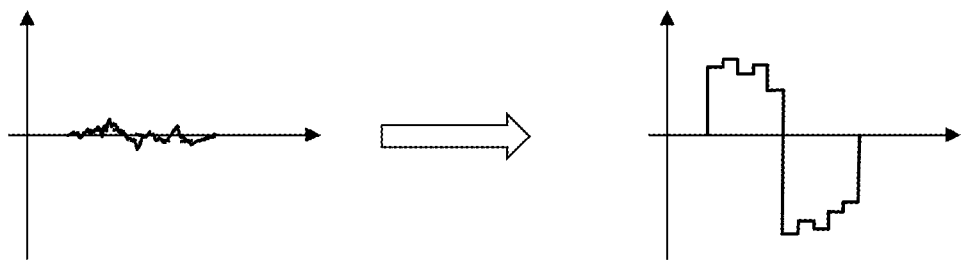
Figure 5C:
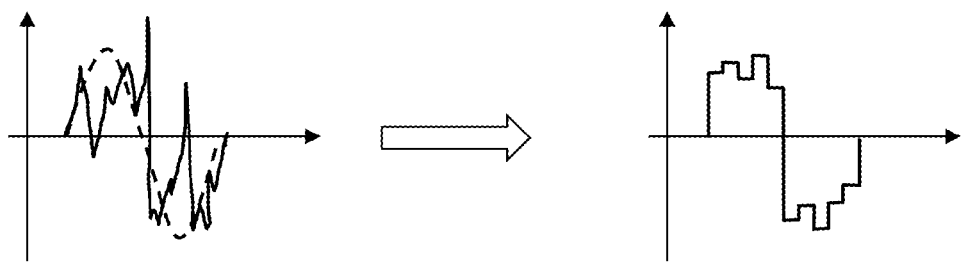
Figure 5D:
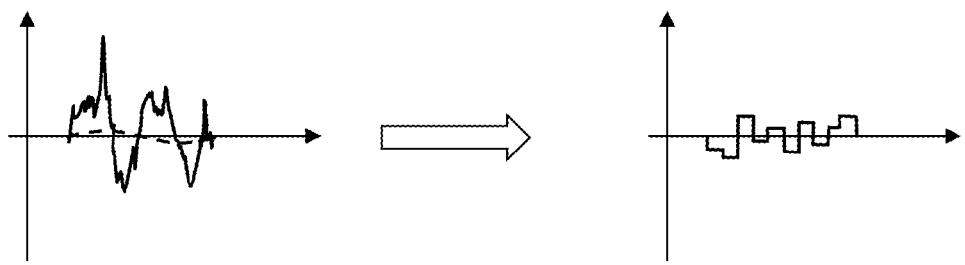
Figure 6:
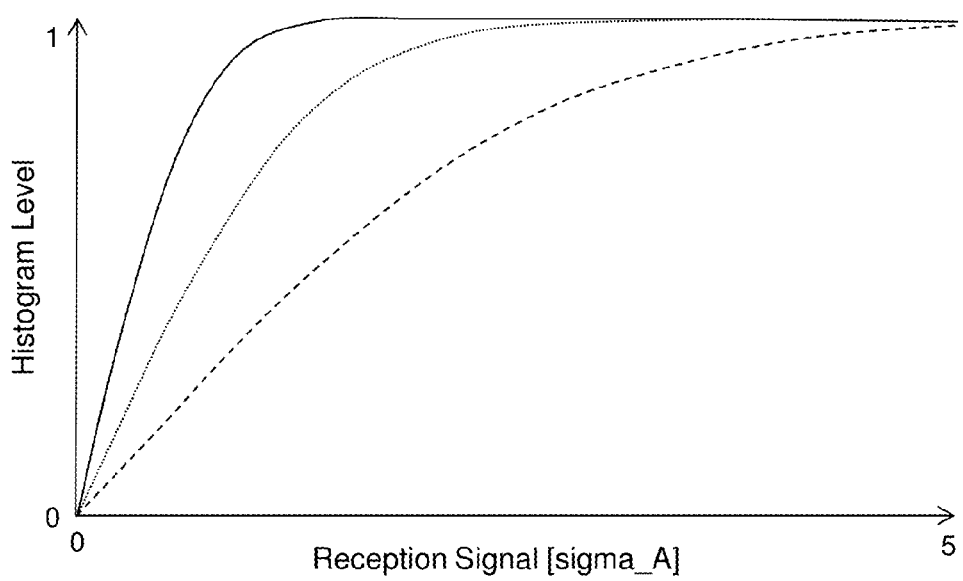
Figure 7:
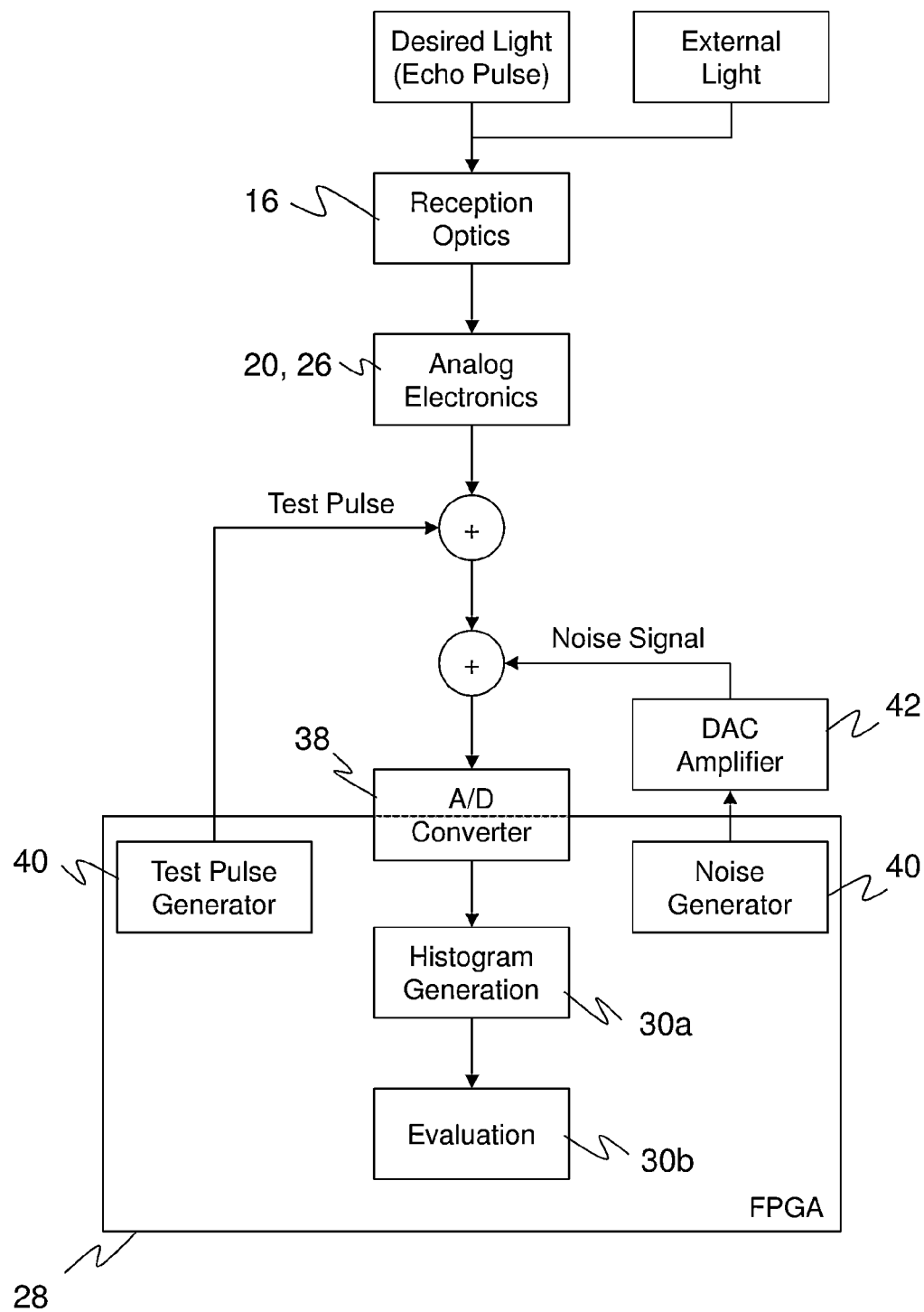

The invention will be explained in the following also with respect to further advantages and features with reference to exemplary embodiments and the enclosed drawing. The Figures of the drawing show in:

FIG. 1 a block diagram of a distance measuring sensor;

FIG. 2 a block diagram of a measurement core for the signal processing in the sensor according to FIG. 1;

FIG. 3 a schematic representation of the signals in various processing stages for explaining an evaluation method with forming histograms in the measurement core according to FIG. 2;

FIG. 4a-b an idealized representation of a strong desired signal and a weak interference echo, respectively, and of the corresponding histograms;

FIG. 5a-b an exemplary representation similar to FIG. 4, but with an additional weak noise signal;

FIG. 5c-d an exemplary representation similar to FIG. 4, but with an additional strong noise signal;

FIG. 6 exemplary characteristics of the saturation of the histograms versus reception signal level for different noise levels; and FIG. 7 a block diagram of the reception path with addition of artificial noise.

FIG. 1 shows a block diagram of a distance measuring sensor 10 in an embodiment as a one-dimensional optoelectronic distance scanner. A light transmitter 12 is oriented so that its transmission light passes through a beam splitter 14 and subsequently through optics 16 into a monitoring area. There, if an object 18 is positioned within the optical path, the transmission light is reflected or remitted by the object 18 and returns, again through the optics 16, to the beam splitter 14, where it is reflected into a light receiver 20 and thus detected. The beam splitter arrangement is to be understood merely as an example, the invention also encompasses other arrangements without beam splitter, for example a double-eye-arrangement. The explanation based on a one-dimensional optoelectronic sensor is likewise to be understood as an example, because the sensor 10 may also be a multi-dimensional system, such as a laser scanner, or even operate with completely different electromagnetic signals, such as a TDR level sensor.

A measurement core 22 controls the light transmitter 12 and evaluates the signals of the light receiver 20. In order to determine a light time of flight for a distance measurement of the object 18, light pulses are transmitted and received, and the difference between transmission and reception point in time is determined. This evaluation is not carried out on the basis of a single event with only a single light pulse, but in an evaluation based on a histogram which is formed by a plurality of individual events.

This statistical evaluation will now be explained in detail with reference to FIGS. 2 and 3. FIG. 2 shows a block diagram of the measurement core 22. In a transmission path, in addition to the actual transmitter 12 a driver circuit 24 is also provided, while in a reception path the receiver 20 feeds the reception signal via an analog preprocessor 26 to a control and evaluation unit 30 for example implemented on an FPGA 28.

The analog preprocessor 26 forms a multi-stage processing path. It begins with an amplifier 32, for example a transimpedance amplifier, which receives and amplifies the signal of the receiver 20. A downstream filter 34, which for example can be a band pass filter or a differentiator, converts the unipolar signal of the pulse into a bipolar signal. Amplifier 32 and filter 34 may also be connected in reverse order. As a next preprocessing stage, a limiter amplifier 36 is provided which amplifies and cuts off the amplitude so that the pulse signal is a rectangular pulse driven into saturation. This signal, as a final preprocessing stage, is fed to an A/D converter 38, in particular a binarizer, which does not convert the amplitude into a digital number value, but merely into a binary value. The A/D converter 38 preferably is not a separate component, but implemented via the inputs of the FPGA 28.

The signal and evaluation path through these components as just described will now be explained with reference to FIG. 3. The statistical evaluation with a plurality of individual measurements enables a reliable determination of the reception point in time. The transmitter 12 generates a transmission signal in a respective measurement period 100 which enables the determination of a precise point in time. A rectangular pulse is a suitable shape, but other signals are also conceivable, such as a Gaussian pulse, a multimodal signal for example for a coded identification of each signal, and also steps functions. All these signal shapes are referred to as pulses in the following.

The pulse is reflected by the target object 18 and, after conversion into an electrical signal in the receiver 20, amplified in the amplifier 32. The resulting amplified electrical reception pulse 102 is shown in idealized form without noise. In the filter 34, the unipolar reception pulse 102 is converted into a bipolar signal 104. This may be done with a band pass filter of suitable filter frequency. Next to the bipolar signal 104, gray rectangles are shown, symbolizing an arbitrary signal course outside the reception pulse 102, which is not considered. Moreover, only one sine oscillation of the bipolar signal 104 is shown. Further oscillations, i.e. additional sine periods with decreasing amplitude, are omitted for simplicity of illustration. Of course, no pure sine can be expected, but at least a curve having a maximum and a minimum.

In the limiting amplifier 36, the bipolar signal 104 is amplified to an extend that, after cutting off, the actual signal becomes a rectangular edge 106, and that the noise level shown by gray rectangles is extended in its amplitude over the entire dynamic range. The rectangular edge 106 is sampled in the binarizer 38 with a sampling rate of for example 2.5 ns corresponding to a clock rate of the FPGA 28 of 400 MHz. This sampling rate is shown by arrows 108 in FIG. 3. The resulting bit sequence is used in the evaluation unit 30 to form a histogram 110. For each bin having a width of 2.5 ns corresponding to the sampling rate, one accumulator is provided that is only incremented for a corresponding bit value "1".

For ideal signals only that bin of this histogram 110 would be filled up that matches the position of the rectangular edge 106. However, the noise level, raised by limiting amplifier 34, also fills up the other bins, in the example of random noise statistically once every other measurement period 100. If the method as described is iterated and the histogram 110 formed over k measurement periods 100, the bins are filled with approximately the value k/2 due to the noise, where statistical fluctuations are to be added. This value of k/2 corresponds to a signal value zero due to the binarization. From that background, the maximum formed by the positive part of the bipolar signal 104 rises upwards, and the corresponding minimum shows downwards. Together with further oscillations not shown in FIG. 3, the histogram 110 has a characteristic course in the region of the reception point in time, whose signature is used by the control and evaluation unit 30 to determine the reception point in time. The statistical evaluation of a plurality of individual measurements enables this evaluation even if the individual measurement in one measurement period 100 would not allow a reliable distance determination due to desired signals being too weak.

The reception point in time can reliably be determined from the first zero crossing of maximum to minimum. In the Figure, the zero crossing is located in the bin marked with an arrow 112. The temporal accuracy of this information initially is limited by the resolution of the histogram, i.e. for example to 2.5 ns, and thus directly coupled to the sampling rate of the A/D converter 38. By various techniques, such as described in EP 2189804 A1 and EP 2189805 A1 cited in the introduction, this resolution can be further increased, and it is referred to these documents for details.

The digital sampling and accumulation of repeated signals in a histogram has considerable advantages to detect the desired signal in a noise background. However, the signal level in the histogram in contrast to conventional methods does not only depend on the input signal, i.e. the reception pulse 102, but also depends crucially on the competing superimposed noise level or the ratio of desired signal to noise signal, respectively. This effect is used by the invention to control the sensitivity of the transmission of the analog input signal to the digital histogram by adding an artificial noise. Thus, the sensitivity can be set to a useful operating point for distinguishing between interference signal and desired signal.

In order to further explain the problem, FIG. 4a shows in an idealization without noise components a strong true or desired echo, and FIG. 4b shows a weak interference echo, each with associated histogram. The echoes correspond to reception pulses 102 of an object to be detected and a small interference such as a dust particle, respectively. However, the corresponding histograms are identical and do not allow a distinction, because the interference echo already saturates the histogram completely. This is because the 1-bit digitization only decides whether a signal is above a binarization threshold, in this case is positive, or not. This criterion, however, is met by both the strong desired echo and the weak interference echo and thus does not make a difference in the histogram.

The solution according to the invention is to provide a sufficient noise level. This is illustrated in FIG. 5a-b for a weak noise level. Nothing changes for the strong desired echo according to FIG. 5a. The noise level does not suffice to pull a significant portion of the reception signal from positive to negative or vice versa. Consequently, the associated histogram remains completely saturated with maximal level. For the weak interference echo according to FIG. 5b, however, the noise level is strong enough to cause a change of sign through the binarization threshold for a measurable portion of the reception signal. The noise stops the determinism. The associated histogram still shows a bipolar reception pulse, but no longer with maximal level. Therefore, thanks to the noise, it can still be seen in the histogram that the signal of FIG. 5b is weaker than the signal of FIG. 5a.

At a much greater noise level according to FIGS. 5c-d, the reception levels of the strong desired echo are driven through the binarization threshold by the noise as shown in FIG. 5c. The associated histogram no longer has maximum level. The greater noise level dominates the weaker interference signal as shown in FIG. 5d, so that the associated histogram only comprises random values, and the reception signal can no longer be identified.

The noise level thus provides a parameter for setting the sensitivity of the histogram, i.e. which echoes still are resolved, in particular with maximal level, and which echoes are not. This relation, which also can be described analytically, is systematically summarized with reference to FIG. 6. There, characteristics of the transfer function from analog to digital are shown, i.e. the histogram level in dependence on the analog reception signal, for different noise levels, namely, for a weak noise level with sigma=0.5 by a solid characteristic line, for a moderate noise level with sigma=1 by a dotted line, and for a stronger noise level with sigma=2 by a dashed line. The units of the noise level are thus comparable with those of the reception signal on the X-axis. The Y-axis is normalized, so that a value of one corresponds to a histogram saturated with maximal level.

With very low noise, even a very weak signal such as an interference pulse already causes a strong or even saturated histogram level. With increasing noise, the associated characteristic line becomes flatter. Therefore, by adjusting the noise level, the characteristic line can be manipulated so that weak signals merely cause weak histogram levels, while the relevant desired signals completely saturate the histogram. Then, desired signals and interference signals can be distinguished in the histogram. There is still the precondition that the weakest desired signal is stronger than the strongest interference signal, because the histogram cannot carve out properties which have not even been present in the raw signal.

The effect can be observed experimentally when noise from a natural source superimposes the analog reception signal. For example, upon irradiation of strong external light, the amplitude of the desired signal in the histogram is reduced. This is a fundamentally different behavior than in conventional single pulse evaluation. There, external light increases the noise of the signal and degrades the signal-to-noise-ratio, but the signal level of the desired signal as such is not affected by external light.

The invention preferably does not use natural noise with not or only poorly controllable noise level, but specifically adds an artificial noise to set a desired characteristic line according to FIG. 6.

FIG. 7 shows a corresponding block diagram of the reception path. The physical input signal is the desired light with the echo pulse caused by reflection of the transmission pulse at the object 18. External light as a component of natural noise can be superimposed on the input signal. The reception light is focused onto the light receiver 20 by reception optics 16, is converted into an analog reception signal and preprocessed as described with reference to FIG. 2. Prior to the digitization, a noise signal with a noise level setting the desired sensitivity is added. In addition, a test pulse may be injected, which will be described below. After digitization in the A/D converter 38, histogram generation 30a and evaluation 30b are carried out.

In this context, the term "noise" is to be understood as an interference voltage, which is added as an interference with a broad but finite frequency spectrum to the desired signal. The noise signal should preferably resemble white noise in order to prevent a misinterpretation as a desired echo in the downstream evaluation, i.e. should preferably be a stochastic signal with constant power spectrum and normal distribution.

The generation of the noise can be done in various ways. FIG. 7 shows a digital variant with a noise generator 40 which is implemented on the FPGA 28. By nesting several random number generators and shift registers, the limitation by the clock frequency of FPGA 28 can be overcome. A downstream DAC 40 (Digital Analog Converter) enables adding of the initially digital noise signal to the analog reception signal. By an additional variable amplification, e.g. by means of a PGA (Programmable Gain Amplifier), the control and evaluation unit 30 is able to vary the noise level.

In contrast to FIG. 7, the noise generator may also be of analog construction, for example as a Zener noise generator where a diode or a base-emitter path of a transistor is operated in reverse direction above its breakdown voltage. The resulting electromagnetic field generates a (shot) noise signal which may comprise a high frequency band width of more than 10 GHz. The choice between analog and digital implementation of the noise generator is in principle free and depends among others on the desired frequency spectrum of the noise signal as well as the properties of the desired signal and its sampling.

Generally, the noise can also be added to the optical signal, for example shot noise by external light. Addition immediately upstream the digitizing, however, is easier to implement and also advantageous because in that case no intermediate signal processing steps can influence the noise.

It should be mentioned that superimposing the reception signal with noise does not only have advantages, because there is an inevitable loss of information. This should not be judged by the signal-to-noise ratio of the individual signal, because a sufficiently random noise can be averaged out by the repetitions and does not prevail against the systematic desired and interference echoes. However, especially when irradiating strong external light, a loss in measurement accuracy is observed. Therefore, this needs to be weighed against the advantages of a possibility to actively adjust the sensitivity.

In a sensor 10 used in safety technology, the common safety requirements as mentioned in the introduction of course also have to be met with the additional noise. It is problematic, from a safety technology point of view, to modify the sensitivity of the signal processing chain, because this is a property with direct impact on the detection capability of the system. It is therefore advantageous, if not even necessary, to test the transfer characteristic. To this end, a test pulse generator 44 of the FPGA 28 generates a test pulse which is added to the reception signal directly upstream the feeding point of the noise. The test pulse can be placed in the histogram outside the actual measurement region, i.e. at the very beginning or end, so that the test pulse does not influence the measurement echoes. Since the test pulse is fed in downstream the preprocessor 26, it remains temporally compact and does not excite an oscillation by the filter 32 like the measurement echoes do. Alternatively, one could also test the preprocessor 26, but would have to put enough time between test pulse and a possible subsequent measurement pulse in order to allow the test signal to fade. What is tested in any case is whether the test pulse is detected as expected. For example, the digital amplitude of the test pulse in the histogram is compared with an expected value previously taught.

So far, a suitable noise level has been looked for in order to set the characteristic line, and thus an operating point, which defines whether a is interpreted as an interfering echo or as a desired echo by the sensor 10. However, the feeding of the noise has other advantages and offers additional possibilities.

The artificial noise enables an external light compensation. According to the invention, noise is added to the reception signal in order to specifically set the transfer characteristic. In case of additional natural noise, especially by external light, the artificial noise can be decreased by just this natural noise. This ensures on the one hand that the desired operating point is set despite the natural noise. On the other hand, this also has the effect that the impact of the natural noise or external light does not show any more and is completely eliminated from the system. Of course, this is only possible as long as the natural noise is less than the artificial noise to be set. If the system detects a natural noise above that threshold, the best solution may be not to add any additional noise in order to at least approximate the desired operating point as best as possible under the current conditions.

The noise level sets a characteristic line and thus a certain dynamic range. Since merely the gain needs to be adapted, the system enables a switch to a different characteristic line from one transmission pulse to the other. This can be used in an embodiment to increase the dynamic range (HDR, High Dynamic Range). From the individual measurements together forming a histogram, several sub groups are formed, and a different noise level is set for each sub group. For example, if the histogram consists of 84 individual measurements, 42 individual measurements are recorded with transfer characteristic A, 21 individual measurements with transfer characteristic B, and 21 individual measurements with transfer characteristic C. The transfer characteristics lead to different sensitivities. A histogram accumulated with weights differing in correspondence with the group sizes and characteristic lines significantly increases the dynamic range of the mapping of the analog signal onto the digital histogram signal. Although this does not have any impact on the maximal dynamic range of the analog signal processing part, this still is a considerable improvement as long as the dynamics anyway mainly are limited by the digital sampling.

In combining the characteristic line setting by means of the noise level and a parallel sampling of the analog reception signal at several comparator inputs of the FPGA 28, a parallel multi-channel sampling with differing sensitivity is achieved. In a simple evaluation, an insensitive channel is merely used to coarsely locate relevant desired echoes, while the actual reception point determination is done with a sensitive channel, but in the same relevant time interval. This combines maximal measurement accuracy with the possibility to filter out interference echoes. Generally, the multi-channel sampling extends the digital dynamic range by selecting the best measurement results or combining measurement results in a subsequent common evaluation.

Such a system is also suitable for detection in the fog. Due to the filter 32, the fog echoes, having rather low frequencies, are anyway suppressed to some extent. With the invention, high dynamic range and additional distinguishability of echoes are also provided. Weak fog echoes can thus be clearly separated from the object echoes.

The invention claimed is:

1. A distance measuring sensor (10) for a detection and distance determination of objects (18) in a monitoring area, the sensor (10) having a transmitter (12) for transmitting transmission pulses, a receiver (20) for generating a reception signal from transmission pulses remitted from the monitoring area, an A/D converter (38) for digitizing the reception signal, and a control and evaluation unit (28, 30), which is configured to transmit a plurality of transmission pulses via the transmitter (12), to accumulate the respective reception signals generated by the receiver (20) in a histogram (110), and to determine, from the histogram (110), a reception point in time and thus a measurement value for the signal time of flight from the sensor (10) to the object (18), wherein the sensor (10) comprises a noise generator (40) configured to add a noise signal to the reception signal prior to its digitization in the A/D converter (38), and wherein the noise generator (30) generates a noise level adaptable by the control and evaluation unit (30) in order to set a reception sensitivity of the sensor (10).

2. The sensor (10) according to claim 1, wherein the A/D converter (38) is a binarizer.

3. The sensor (10) according to claim 1, wherein an analog preprocessing circuit (26) including a filter (30) for a conversion of a unipolar reception signal (102) into a bipolar signal (104) is arranged between receiver (20) and A/D converter (38).

4. The sensor (10) according to claim 1, wherein the control and evaluation unit (30) is implemented on a digital module.

5. The sensor (10) according to claim 4, wherein the digital module is a PLD, an ASIC, or an FPGA.

6. A distance measuring sensor (10) for a detection and distance determination of objects (18) in a monitoring area, the sensor (10) having a transmitter (12) for transmitting transmission pulses, a receiver (20) for generating a reception signal from transmission pulses remitted from the monitoring area, an A/D converter (38) for digitizing the reception signal, and a control and evaluation unit (28, 30), which is configured to transmit a plurality of transmission pulses via the transmitter (12), to accumulate the respective reception signals generated by the receiver (20) in a histogram (110), and to determine, from the histogram (110), a reception point in time and thus a measurement value for the signal time of flight from the sensor (10) to the object (18), wherein the sensor (10) comprises a noise generator (40) configured to add a noise signal to the reception signal prior to its digitization in the A/D converter (38), wherein the noise generator is implemented as a digital unit.

7. The sensor (10) according to claim 4, wherein the noise generator is implemented on the digital module (28).

8. The sensor (10) according to claim 1, wherein the control and evaluation unit (30) is configured to set a suitable noise level of the noise generator (40) in advance.

9. The sensor (10) according to claim 1, wherein the control and evaluation unit (30) is configured to take account of a natural noise signal when setting a noise level of the noise generator (40).

10. The sensor (10) according to claim 1, wherein the control and evaluation unit (30) is configured to vary a noise level of the noise generator (40) during accumulation of a histogram (110).

11. The sensor (10) according to claim 1, wherein the control and evaluation unit (30) is configured for a multi-channel re-cording and evaluation of histograms (110) in order to evaluate the reception signal with different sensitivities due to different noise levels of the noise generator (40) in the plurality of channels.

12. The sensor (10) according to claim 1, the sensor (10) comprising a test signal generator (44) for injecting a test signal into the analog part of the receiving path in order to check the function of the receive path.

13. The sensor (10) according to claim 1, the sensor (10) being configured as an optoelectronic sensor, wherein the transmitter (12) is a light transmitter and the receiver (20) is a light receiver.

14. The sensor (10) according to claim 13, wherein the sensor (10) is a laser scanner.

15. A method for a detection and distance determination of objects (18) in a monitoring area by a sensor (10), wherein a plurality of transmission pulses is transmitted and reception signals are generated from the transmission pulses remitted from the monitoring area, the reception signals are digitized and accumulated in a histogram (110) in order to determine, from the histogram (110), a reception point in time and thus a measuring value for the signal time of flight to the object (18), wherein a noise signal is added to the reception signal prior to its digitization, and wherein a noise generator (30) generates a noise level adaptable by a control and evaluation unit (30) in order to set a reception sensitivity of the sensor (10).

* * * * *